United States Patent [19]

Richardson et al.

[11] 4,363,384

[45] Dec. 14, 1982

[54] BRAKE ASSEMBLY

[75] Inventors: Leonard H. Richardson, Dearborn Heights; Otto Mueller, Jr., Detroit; Lee E. Elfes, Bloomfield Hills, all of Mich.

[73] Assignee: Massey-Ferguson Inc., Detroit, Mich.

[21] Appl. No.: 930,310

[22] Filed: Aug. 2, 1978

[51] Int. Cl.³ ............................................. F16D 55/08
[52] U.S. Cl. ...................................... 188/72.7; 29/469; 74/710.5; 188/18 A; 188/71.1; 188/71.4; 308/72
[58] Field of Search ................... 188/71.1, 72.7, 71.4, 188/31, 69, 18 A; 192/4 A; 74/710.5, 710; 308/72; 29/469

[56] References Cited

U.S. PATENT DOCUMENTS

| 2,026,733 | 1/1936 | Fast | 192/93 A X |
| 2,387,039 | 10/1945 | Parrett . | |
| 2,786,561 | 3/1957 | Parrett | 192/70.23 |
| 2,874,807 | 2/1959 | Hahn . | |
| 3,122,217 | 2/1964 | Holz . | |
| 3,382,952 | 5/1968 | Grottapaglia . | |
| 3,947,075 | 3/1976 | Ewertz | 308/72 |
| 4,016,957 | 4/1977 | Osujo et al. | 188/72.7 |
| 4,036,329 | 7/1977 | Anderson | 188/72.7 |

FOREIGN PATENT DOCUMENTS 837917 1/1976 Belgium .

*Primary Examiner*—George E. A. Halvosa
*Attorney, Agent, or Firm*—John C. Thompson

[57] ABSTRACT

A disc brake assembly carried within a defferential housing immediately to the rear of a transmission housing. The brake assembly includes a casting mounted to the rear of the transmission housing and which supports a disc brake construction adapted to engage discs on the output shaft of the transmission. The casting also pivotally supports an actuating lever, the other end of the lever being provided with a cam follower surface. One end of a rod is rotatably journaled and supports a cam which engages the cam follower surface. The other end of the rod is provided with a modified spherical surface which passes through a cylindrical aperture in the differential housing so that the other end of the shaft projects outwardly therefrom. The parts are so made that they can be readily assembled.

3 Claims, 3 Drawing Figures

4,363,384

BRAKE ASSEMBLY

TECHNICAL FIELD

The present invention relates generally to tractor parking brake assemblies and more particularly to an assembly which includes a disc brake construction adapted to be disposed in a differential housing immediately to the rear of a transmission housing.

BACKGROUND ART

Disc parking brakes for tractors are well known in the art. It has been proposed in the past to mount a disc brake construction on the output shaft of the transmission. In many tractors this presents serious design limitations as the differential housing is disposed immediately to the rear of the transmission, which differential housing also serves as an oil reservoir. Therefore, it is essential that the actuating mechanism for the parking brake be so designed that dirt and other foreign substances cannot be introduced into the differential housing at that place where it passes through the differential housing. One such prior art construction which achieves the foregoing objective is shown in Belgium Pat. No. 837,917. In accordance with the Belgium patent, a rotary shaft actuator is carried by a special member which is in turn secured to the periphery of a large opening in the sidewall of the differential housing. It should be appreciated, however, that the foregoing construction requires a special form of differential housing. As the tooling for providing such housings is very costly, it is desirable to provide a novel brake construction which can be utilized in existing differential housings.

DISCLOSURE OF INVENTION

It is the principal object of the present invention to provide a brake assembly including a disc brake construction carried within a differential housing disposed immediately to the rear of a transmission housing which does not require any substantial modification to the differential housing.

The above object and other objects are accomplished by providing a mounting structure secured to the rear of the transmission, the mounting structure in turn supporting a disc brake construction adapted to engage discs carried by the output shaft of the transmission. The disc brake construction includes a shiftable link which is adapted to apply the brake, the shiftable link in turn being interconnected with the midportion of a lever, one end of the lever being mounted on the mounting structure, and the other end of the lever being provided with a cam follower surface. A cam is rotatably supported on a fixed structure and engages the cam follower surface, the cam surface preferably being in the form of an Archimedes spiral. The cam is in turn secured to a shaft which passes through a cylindrical aperture in the differential housing, the shaft being provided with a modified spherical surface and suitable seals to accommodate for misalignment of the cylindrical aperture with the cam and to prevent the intrusion of foreign substances into the differential housing. The shaft is threaded at its lower end to permit assembly after the differential housing has been secured to the transmission.

DETAILED DESCRIPTION

Figure 1:
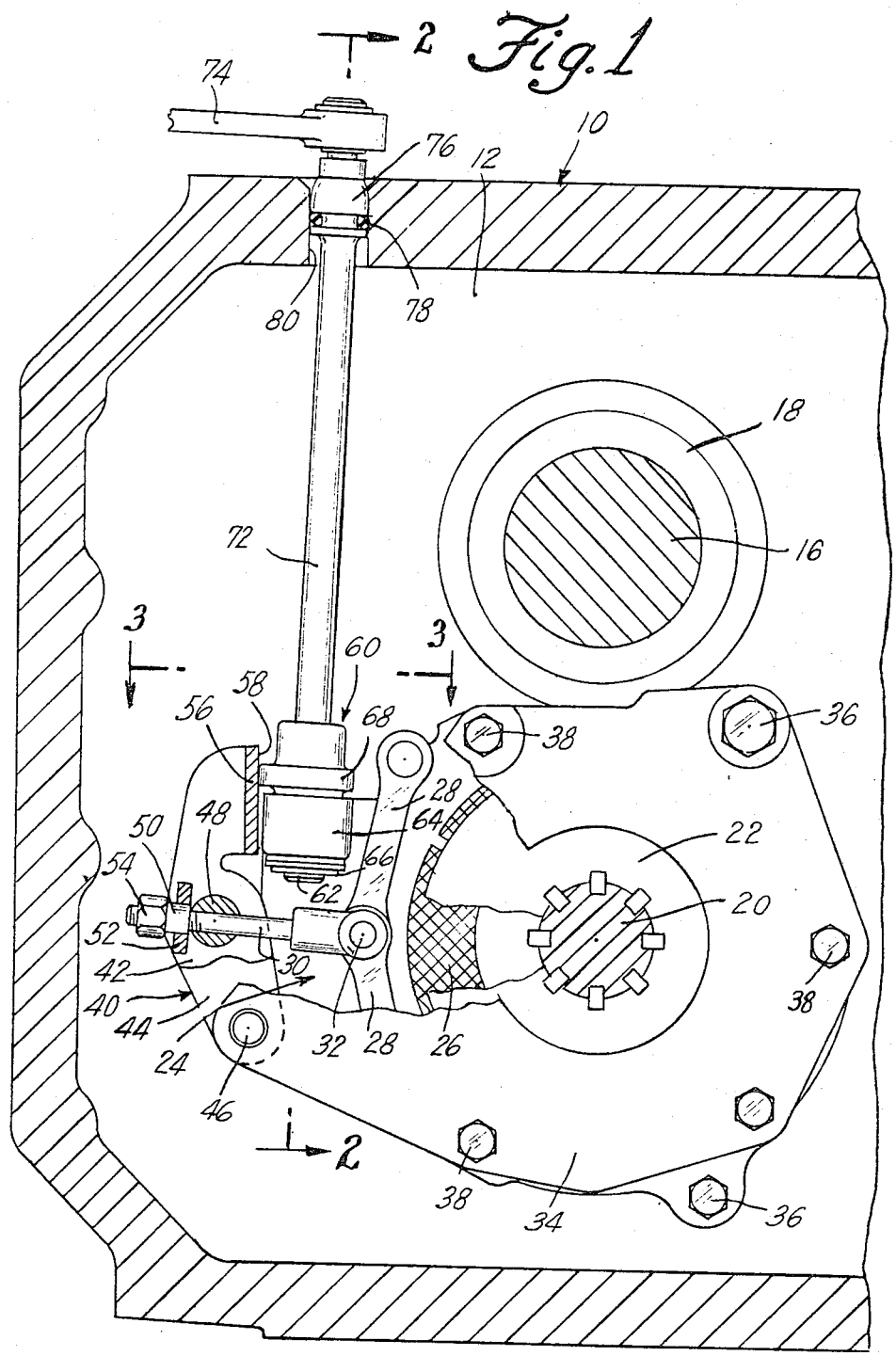
FIG. 1 is a sectional view taken through a differential housing, said view looking forward towards the rear wall of a transmission housing and showing the brake assembly of this invention.
Figure 2:
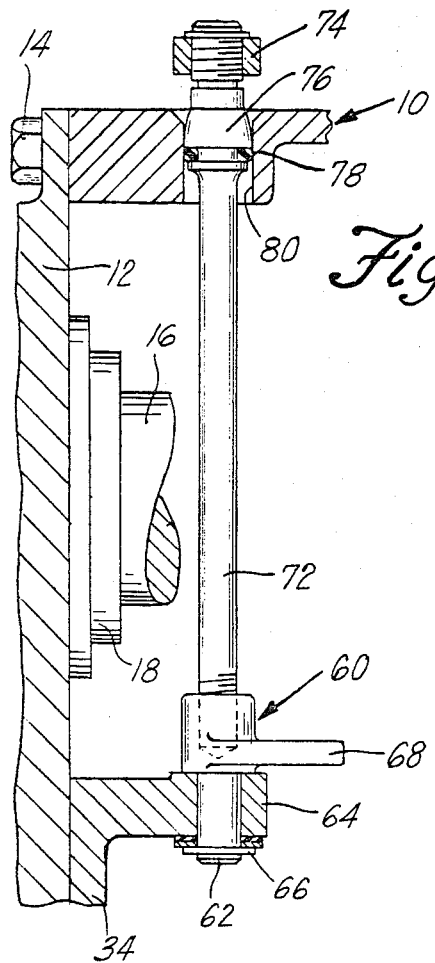
FIG. 2 is a section taken generally along the line 2—2 in FIG. 1.
Figure 3:
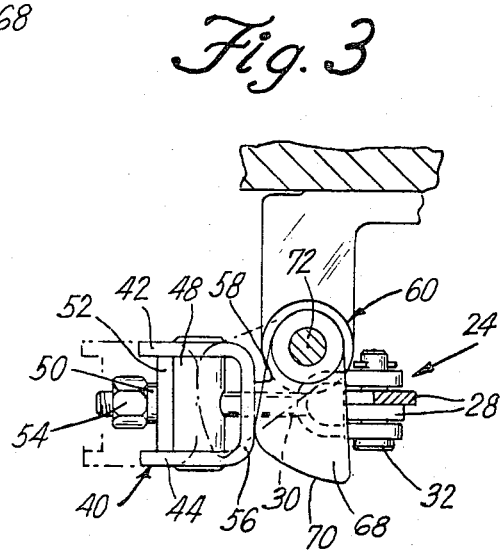
FIG. 3 is a section taken generally along the line 3—3 in FIG. 1 showing the brake in full lines when it is not being applied, and in dotted lines when the brake is being applied.

Referring now to the various figures, a differential housing is indicated generally at 10. The forward end of the housing 10 is secured to a transmission housing 12 by bolts 14, only the rear wall of the transmission housing 12 being shown. As is conventional in a tractor, a pair of shafts project rearwardly from the transmission, one of the shafts 16 being the power takeoff shaft, this shaft being supported by bearings 18, and the other shaft 20 being the drive shaft, this shaft also being supported by bearings (not shown). While the drawings illustrate the drive shaft 20 spaced below the power take-off shaft 16, it should be appreciated that in some tractors the PTO shaft may be spaced below the drive shaft. A plurality of discs 22 are mounted on the power shaft 20 for rotation therewith. As shown in the drawing, the discs 22 are keyed to the shaft 20, but in actual practice they are customarily provided with an integral surface that engages a corresponding spline on the shaft.

A disc brake construction indicated generally at 24 is disposed about the shaft 20, the construction 24 having annular friction elements 26 which may be forced into engagement with the discs 20 through the action of toggle linkage 28, the friction elements 26 when engaging the discs 22 holding the shaft 20 from rotation. The brake construction is also provided with a radially outwardly extending link 30 which is pivotally interconnected as at 32 to the toggle links 28. As such disc brake constructions 24 are well known in the prior art, such as for example U.S. 3,583,529, it will not be described further.

A mounting structure 34 is secured in fixed relationship with respect to the rear wall 12 of the transmission housing by spaced apart bolts 36 (only two of which are shown in FIG. 1). The disc brake construction 24 is carried by the mounting structure 34 in such a manner that the friction elements, toggle links, and shiftable brake applying link 30 will not move relative to the housing 12 when the shaft 20 is rotating, the disc brake construction being held in place by bolts 38.

A bifurcated lever indicated generally at 40 has spaced apart arms 42,44, one end of which are pivotally interconnected to the mounting structure 34 by pivot pin 46. A transverse shaft 48 is journaled in the arms 42,44 and is provided with a bore through which a portion of the link 30 passes. A bearing member 50 passes through a guide plate 52 which is carried by the arms 42,44, the guide plate being held against the shaft 48 by a nut 54 which is received on the threaded end of the link 30. The other end of the lever 40 has a bight portion 56 provided with a cam follower surface 58.

A cam member, indicated generally at 60, has a lower portion 62 which passes through a suitable aperture in a fixed structure 64, the lower portion being held in place by a snap ring 66. The fixed structure 64 may be part of the mounting structure 34 or alternatively be part of the disc brake construction 24. The cam member 60 is provided with an upper radially outwardly extending cam having a cam surface 70 in the form of an Archimedes spiral, the cam surface 70 engaging the cam follower surface 58.

A shaft 72 is provided which is threaded at its lower end into the cam member 60, the upper end of the shaft 72 in turn being fixably secured to an operating lever 74 as by threads or the like. The operating lever 74 is disposed on the outside of the differential housing 10. An upper portion of the shaft 72 is provided with a modified spherical surface 76 and seal 78, the surface 76 and seal 78 being received within a cylindrical aperture 80 in the differential housing 10. It should be appreciated from an inspection of FIG. 1 that the spherical surface 76 is so designed that the shaft 72 can be out of alignment with the cylindrical aperture 80.

It should be appreciated that the structure described above can be readily installed within a differential housing without requiring extensive modifications to a tractor. Thus, the mounting structure 34 is bolted to the rear wall of the transmission, the differential housing and transmission are then secured to each other, and shaft 72 is then passed through the opening 80 and screwed into its operating position. In this regard it should be noted that the opening in 60 which receives the threaded lower end of shaft 72 is closed at its lower end. Finally, the operating lever is secured to the end of the shaft disposed outside of the housing 10. Also, by employing an Archimedes spiral surface on the cam surface 70 equal rotational movements of the operating lever 74 will result in equal linear movements of the cam follower surface 58.

What is claimed is:

1. In a tractor, the combination comprising:
  a differential housing;
  a transmission including a transmission housing secured immediately forwardly of the differential housing, said transmission housing having a rear wall, and a drive shaft extending rearwardly from said rear wall and disposed within the differential housing;
  brake discs mounted on the drive shaft;
  a disc brake construction adapted to engage said disc brakes and hold them from rotation, said disc brake construction also including a shiftable brake applying link;
  a mounting structure secured to the rear wall of said transmission housing and supporting said disc brake construction;
  a lever having an intermediate portion engaged by said link, one end of said lever being pivotally connected to said mounting structure and the other end being provided with a cam follower surface;
  a cam;
  means rotatably supporting the cam in engagement with the cam follower surface; and
  means operable to rotate said cam and capable of causing said drive shaft to be braked, said means including a rotatable shaft passing through an aperture in the differential housing.

2. The combination set forth in claim 1 wherein said rotatable shaft has one end which is threaded into the cam, the other end being secured to an operating level disposed outwardly of the differential housing, an intermediate portion of the shaft being provided with a spherical surface and seal which engage a cylindrical aperture within the differential housing.

3. A method of assembling a disc brake construction and its mounting structure about the output shaft of a transmission having a housing with a rear wall, the shaft being diposed within a differential housing which is secured to the rear wall of the transmission housing when the parts are in their operative assembled relationship, said method comprising the following steps:
  disposing the disc brake construction and its mounting structure about the output shaft of a transmission;
  securing said mounting structure to the rear wall of said transmission;
  securing said transmission to the forward portion of the differential housing, said differential housing being provided with an aperture in one of its side walls;
  passing a portion of an operating shaft through said aperture; and
  screwing the end of said portion of the operating shaft into said disc brake construction and its mounting structure in operative relationship so that rotation of said shaft will cause the disc brake to be applied.

* * * * *